Oct. 11, 1966   A. CANTARUTTI   3,278,360
TIRE FABRIC HANDLING AND STORAGE APPARATUS
Filed Nov. 14, 1963   4 Sheets-Sheet 4

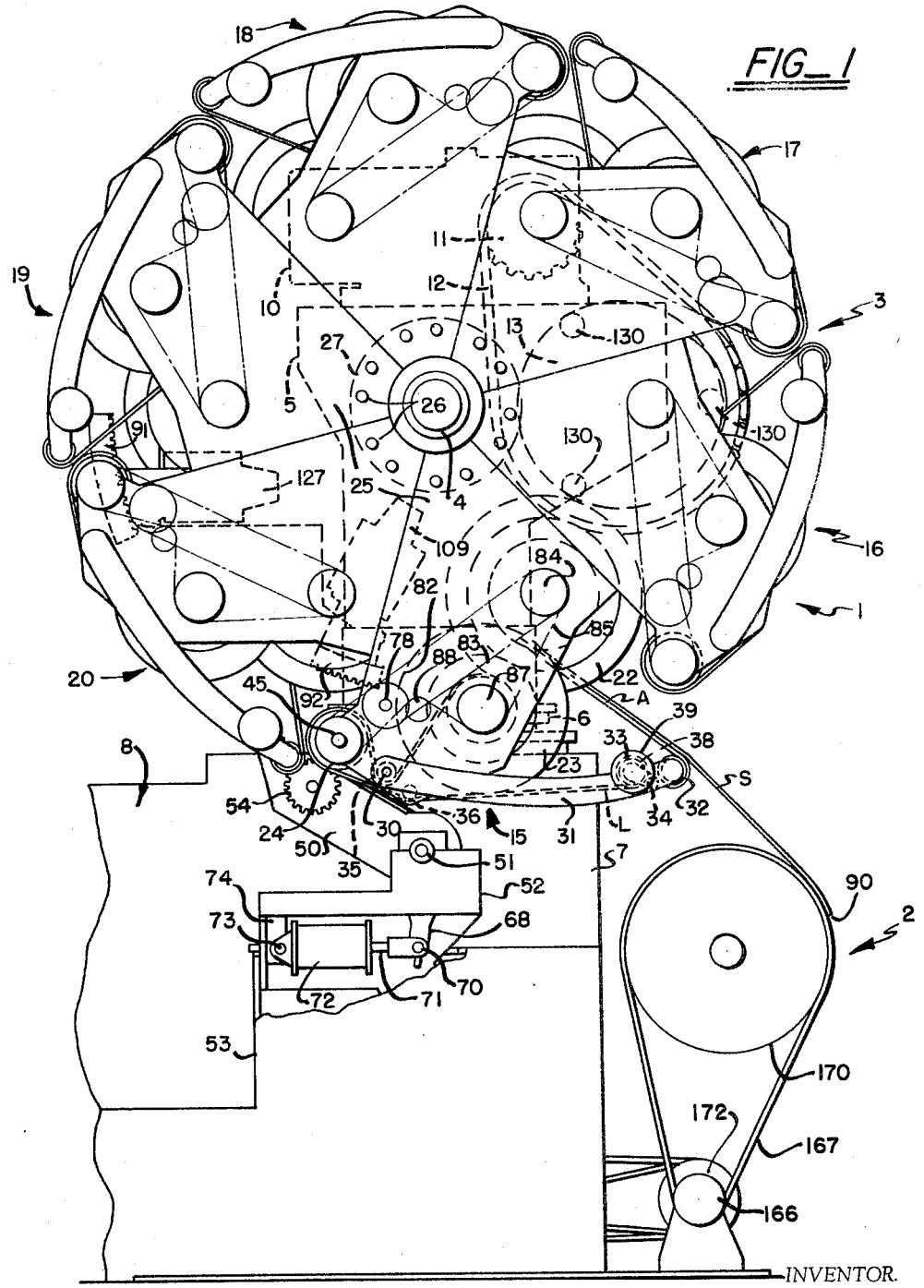
FIG_1

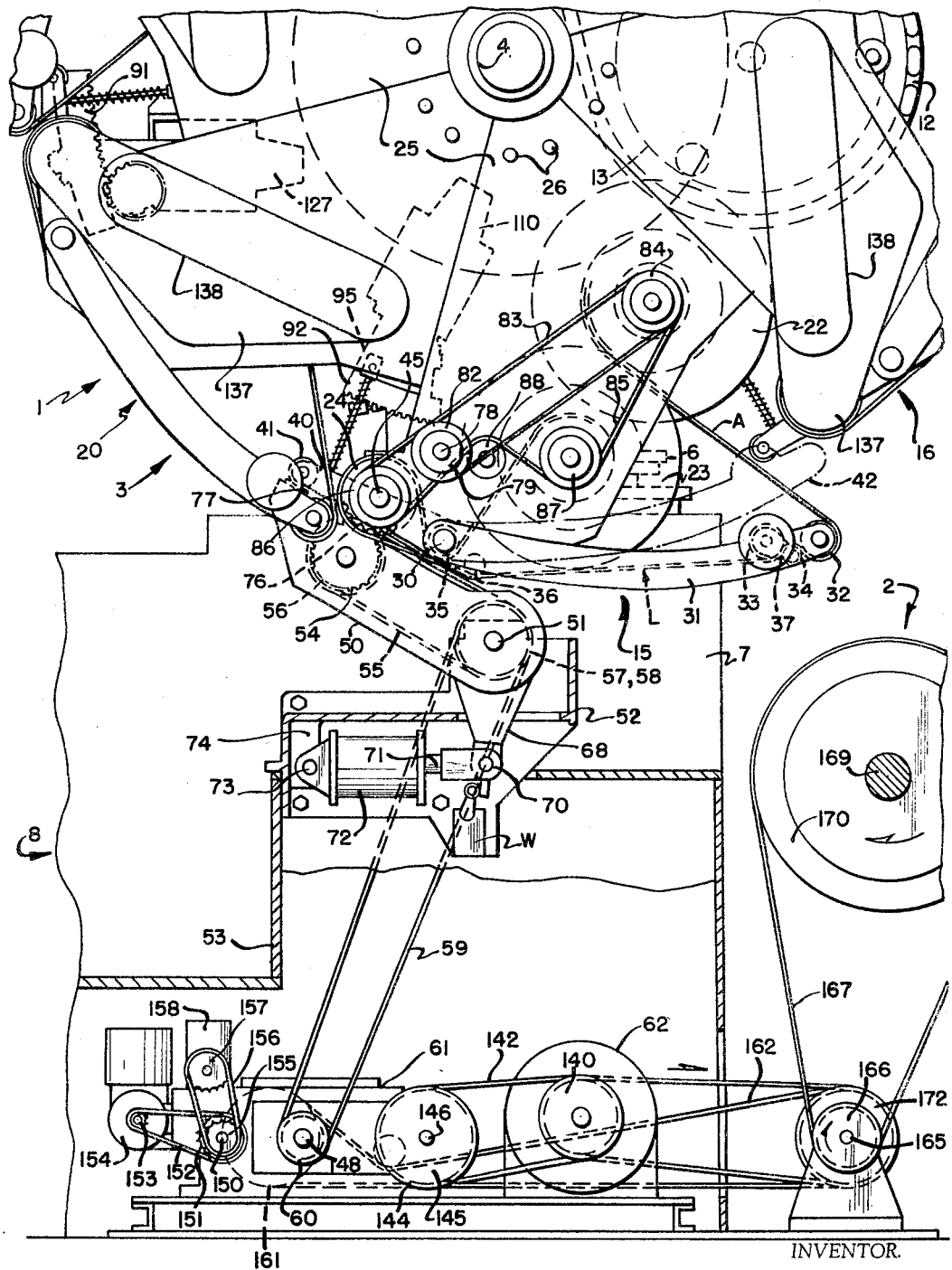

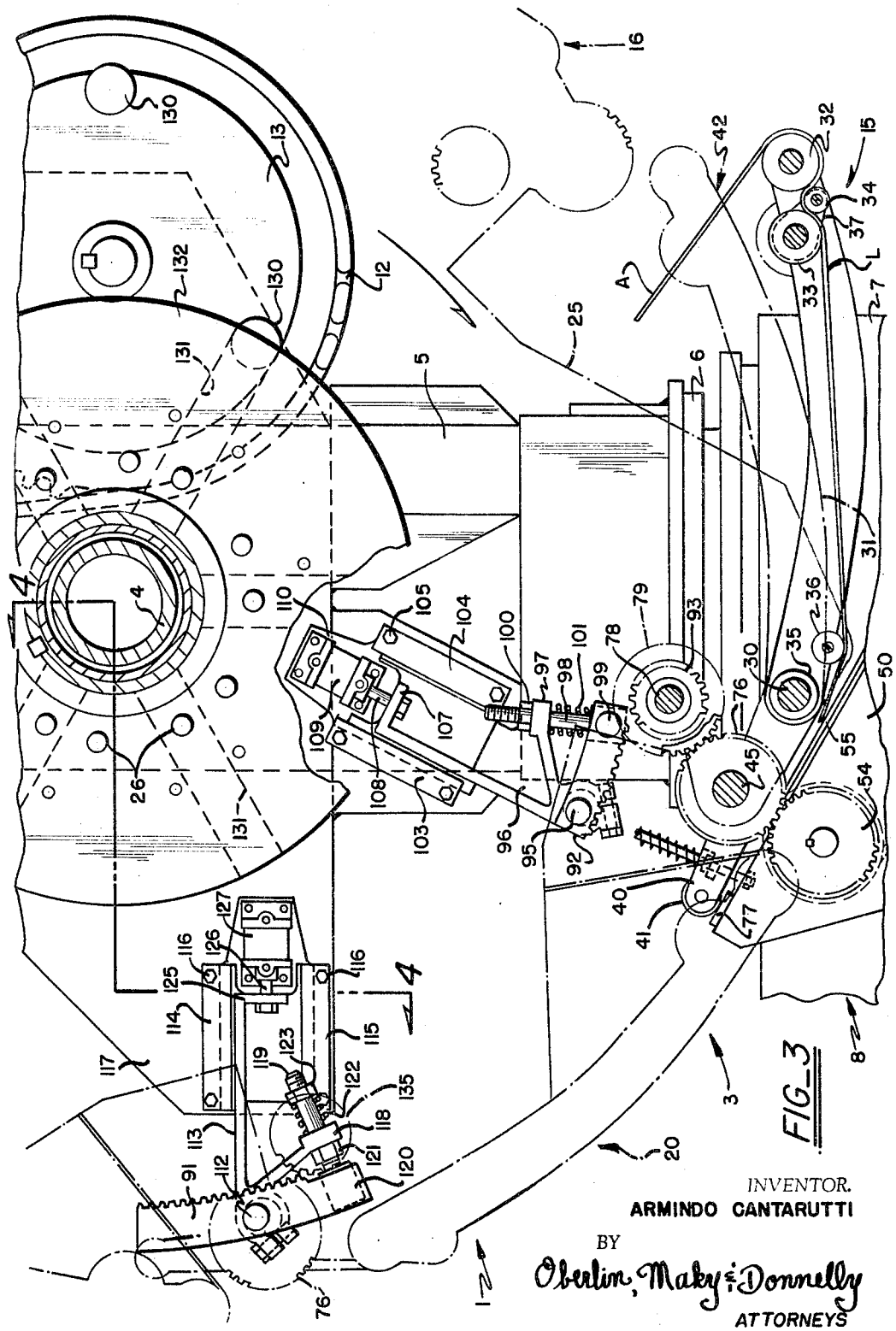

INVENTOR.
ARMINDO CANTARUTTI
BY
Oberlin, Maky & Donnelly
ATTORNEYS

United States Patent Office 3,278,360
Patented Oct. 11, 1966

3,278,360
TIRE FABRIC HANDLING AND STORAGE
APPARATUS
Armindo Cantarutti, Cuyahoga Falls, Ohio, assignor to
NRM Corporation, a corporation of Ohio
Filed Nov. 14, 1963, Ser. No. 323,811
15 Claims. (Cl. 156—406)

This invention relates generally as indicated to tire fabric handling and storage apparatus and more particularly to certain improvements in tire servicers such as that disclosed in the copending application of Edwin E. Mallory and Armindo Cantarutti, Serial No. 162,762, filed December 27, 1961, entitled "Tire Building Apparatus," now Patent No. 3,230,132.

In such copending application there is disclosed a four station tire servicer for a drum type tire building machine which will quickly and conveniently present for dispensation various types of tire building materials to the drum of a tire building machine. Tire fabric materials which form the plies of a pneumatic tire are relatively flimsy and quite tacky and accordingly extremely difficult to handle. When stored on drums, a contiguous layer of a liner material is required to be wrapped therewith and the nature of the material makes it extremely difficult for the operator to wrap such material about the drum at the proper zero tension and yet without any wrinkles or distortions.

The plies of tire fabric material which form the plies of the tire carcass generally have reinforcing cords therein biased in opposite directions. Accordingly, for each ply a different material must be employed and be readily available to the operator of the machine for quick and convenient correct application to the drum. Since tire carcasses of from two to six plies, for example, can readily be produced on the same machine, it is desirable to have a servicer for such machine which will accommodate the maximum number of different type building materials required therein.

It is accordingly a principal object of the present invention to provide a compact tire servicer which can store and dispense a larger number of different tire materials.

Another principal object is the provision of an improved and simplified synchronizing drive between the drum type tire building machine and the selected material dispensing unit of the servicer.

Another object is the provision of a simplified apron mechanism which will facilitate the convenient placement of the material for application to the drum.

Still another object is the provision of a more compact and simplified storage and dispensing unit within the servicer wherein the liner roll is positioned inside the triangle formed by the apron forming arms and the stock roll.

A still further object is the provision of an improved optional wind and rewind mechanism which is responsive to ferris wheel rotation.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a schematic side elevation of a servicer in accordance with the present invention as seen from the drum type tire building machine side thereof;

FIG. 2 is an enlarged fragmentary side elevation partially broken away and in section illustrating more clearly the synchronizing drive between the servicer and the drum type tire building machine;

FIG. 3 is a further enlarged fragmentary side elevation partially broken away and in section illustrating the selectively employable wind and rewind mechanisms which are responsive to ferris wheel rotation;

FIG. 4 is a fragmentary vertical section taken substantially on the line 4—4 of FIG. 3; and FIG. 5 is a somewhat schematic top plan view of the synchronizing drive between the servicer and the drum type tire building machine.

Referring now to the annexed drawings and more particularly to FIG. 1, there is illustrated a tire servicer 1 and a juxtaposed operatively associated drum type building machine 2. The servicer 1 comprises two ferris wheel units 3 mounted on a horizontally extending tubular shaft 4 extending through a frame 5 situated between the ferris wheel units 3 and mounted for rotation about a vertical axis on turntable 6 of pedestal 7. A drive mechanism (not shown) in housing 8 may be employed to rotate the ferris wheel about the vertically extending axis of the turntable 6 to present either to the drum type tire building machine 2 which is to one side of the pedestal 7. A drive unit 10 mounted on the top of frame 5 between the ferris wheels 3 drives sprockets 11 and through chains 12 a Geneva drive mechanism 13 for each of the ferris wheels 3 to index the same about their aligned axes or the horizontal axis of the tubular support shaft 4.

Each ferris wheel 3, in the illustrated embodiment, includes six tire material storage and dispensing units indicated at 15, 16, 17, 18, 19 and 20 which may be identical in form and accordingly only the unit 15 will be described in detail. Each unit, with particular reference to the unit 15, may comprise a stock roll 22, a liner roll 23, and a liner drive roll 24 journalled between laterally spaced segmental plates or side frames 25 secured at 26 by suitable fasteners shown to hub plates 27. The segmental shaped laterally spaced mounting plates 25 complement each other and thus complete the full circle of the ferris wheel 3 when the six illustrated storage and dispensing units 15 through 20 are provided.

A shaft 30 also extends transversely between the plates 25 to which are keyed a pair of arms 31 for pivotal movement therewith. A roll 32 is journalled between the distal ends of such arms. A roll 33 of approximately the same size as the roll 32 is also journalled between the arms near the outer end thereof and a smaller roll 34 is nested between the rolls 32 and 33 to confine the liner L to a sinusoidal path passing thereabout. The liner L which is threaded upon the liner roll 23 passes from the top thereof about a guide roll 35 journalled between the plates 25 and then from beneath such roll about the major circumference of rubber covered liner drive roll 24 and then beneath guide roll 36 journalled between the plates 25 beneath and fairly close to the pivot 30, through the sinusoidal path provided by the rolls 33, 34 and 32, and then upwardly in an inclined manner to be threaded on the stock roll 22 from the underside thereof. It is noted that the shaft of roller 34 is not journalled between arms 31 but between the distal ends of short arms 37 which are secured to the shaft of roll 33. A clockspring 38 in annular housing 39 is employed to bias the roller 34 in a counterclockwise direction as viewed in FIGS. 1–3 to maintain tension in the liner L. The liner L as it passes from the roller 32 at the distal ends of the arms 31 to the stock roll 22 forms an apron indicated at A to facilitate loading and dispensing of the tire building materials or stock S. In this manner, as the liner is wound from the liner roll 23 to the stock roll 22, tire fabric materials S placed upon the apron will be wrapped between the convolutions of the liner on the stock roll 22. In this manner, the stock will be separated by convolutions of the liner and will then not be wound upon itself. When the liner is driven to unwind from the stock roll 22 and wind on the liner roll 23, the stock S will then be caused to move downwardly along the inclined apron A for dispensation to the drum type tire building machine 2 when the selected unit is in position.

Referring now additionally to FIGS. 2 and 3, the inner arm of each pair 31 is provided with a proximal extension 40 having on the end thereof a roller 41 adapted to be engaged as hereinafter described to extend the arms 31 from their phantom line position indicated at 42 to the full line apron forming position for loading and dispensing of the tire stock S. The arms 31 may then be pivoted about the axis of the shaft 30 to and from an extended apron forming position. The shaft 45 of the liner drive roll 24 is journalled between plates 25 and the roll 36 is also journalled between such plates.

The drive for the liner L to move the same in opposite directions for loading and dispensing of the stock will be imparted to the liner drive roll shaft 45. On the machine side of the servicer, such drive may be imparted through a drive arm 50 pivoted at 51 to the top 52 of drive housing 53 for the drum type tire building machine 2. As seen perhaps more clearly in FIG. 5, the distal end of the arm 50 is provided with a pinion 54 driven by timing belt 55 trained about sheaves 56 and 57 journalled at the distal and proximal ends, respectively, of the arm 50. A sheave 58 is also journalled at the proximal end of the arm and a timing belt 59 is trained thereabout as well as about a drive sheave 60 on PIV unit 61 which is in turn driven by drive motor 62 for the drum type tire building machine 2.

With special reference to FIG. 2, the arm 50 may be pivoted about its proximal pivot 51 by means of bell crank arm 68. The bell crank arm constitutes an extension of arm 50 pivoted at 51 to the top 52 of the drive housing 53. The distal end of the arm 68 is pivoted at 70 to rod 71 of piston-cylinder assembly 72. The blind end of the piston-cylinder assembly is pivotally mounted at 73 to bracket 74 within the top housing 52.

Accordingly, retraction of the piston-cylinder assembly 72 will pivot the arm 50 upwardly about its proximal pivot 51 until the pinion 54 on the distal end thereof is brought into engagement with pinion 76 on the liner roll shaft 45. On the machine side of the servicer, the drive thus imparted to the liner drive roll shaft 45 will cause the same to rotate in a clockwise direction as viewed in FIG. 2, for example, pulling the liner and stock thereon from the stock roll 22 with the stock being dispensed upon the drum of the machine 2 and the liner wound on the liner roll 23. It will, of course, be understood that a similar drive mechanism may be provided on the opposite side of the machine which will rotate the shaft 45 in the opposite direction to facilitate loading of stock up the inclined apron A into the stock roll 22.

Retraction of the piston-cylinder assembly 72 and the pivoting of arm 50 also brings plate 77 on the distal end thereof into engagement with roller 41 pivoting the arms 31 downwardly into the apron forming position. A limit switch W is employed to signal the retraction of assembly 72 and the drive engagement as well as apron formation.

With special reference now to FIGS. 2, 3 and 4, to obtain this opposite movement of the liner from the drive imparted to the pinion 76 on the liner drive roll shaft 45, there is provided a counter shaft 78 journalled between the plates 25 having thereon a pinion 79 in mesh with pinion 76 on liner roll drive shaft 45 (see FIG. 4). Thus the shafts 45 and 78 will always be rotated in opposite directions. The counter shaft 78 projects through the outer plate 25 and terminates in a cog belt pulley 82 which may be secured to the end of such counter shaft by means of a cam-roll overrunning clutch. A cog belt 83 is trained about the pulley 82 and also about a dual cog belt pulley 84 on the shaft of the stock roll 22. A further cog belt 85 is trained about pulleys 86 and 87 on the drive and liner roll shafts respectively, about tension roll 88 and about the dual pulley 84 on the shaft of stock roll 22. The cog belt pulley 86 may be mounted on the outer end of the liner drive roll shaft 45 by means of a cam-roll overrunning clutch in the same manner as the pulley 82 is mounted on the end of the counter shaft 78. The drive roll 24 will have a diameter slightly smaller than the diameter of the liner and stock rolls 23 and 22, respectively, so as to maintain tension in the liner between the drive roll and the liner and stock rolls depending upon the direction of rotation of the liner drive roll 24.

When the liner L is being driven from the stock roll 22 to the liner roll 23, the liner drive roll 24 will be driven in a clockwise direction as viewed in FIGS. 1 and 2, for example. In this direction, the clutch mounting cog belt pulley 86 will be engaged to drive the belt 85 also to drive the stock and liner rolls in such clockwise direction through pulleys 84 and 87, respectively. Due to the slightly larger diameter of the liner roll, the liner L will be maintained in tension between the rolls 24 and 23. Tension will be maintained in the liner L between the roll 24 and the stock roll 22 by providing a slip clutch in stock roll 22 so that as the stock roll shaft is being driven in a counterclockwise direction by the belt 85, the liner L will be causing the roll 22 to be turned in a counterclockwise direction with the clutch slipping. Reference may be had to the aforementioned copending application for a more detailed showing of such slip clutch mounting for both the stock and liner rolls.

When the selected unit of the ferris wheel of the servicer is in a loading position on the opposite side as that shown in FIG. 1, the liner may be driven by a mechanism similar to the arm 50 in a synchronized manner from a loading conveyor or the like. In this condition, the liner L will be driven from the liner roll 23 to the stock roll 22 to wind the stock S and the liner L on the roll 22. In this loading condition, the liner drive roll 24 will be driven in a counterclockwise direction as viewed in FIGS. 1 and 2, for example, and through the gearing 79 and 76, the pulley 82 will be driven in a clockwise direction similarly to drive a stock roll 22 through the belt 83 with the clutch for pulley 82 engaged and the clutch for pulley 86 on shaft 45 slipping. Tension in the liner between the liner roll and drive roll will be maintained by the slip clutch of the liner roll. Tension in the liner between the drive and stock roll forming the apron A will be maintained because of the slightly larger diameter of the stock roll as compared to the liner drive roll.

Accordingly, from an external drive such as provided by the arm 50, the various units 15 through 20 may be driven in either direction to facilitate loading and unloading of stock depending upon which of the selected units is indexed by the Geneva drive mechanism 13 into the bottom or loading and unloading position. Such indexing movement will, of course, position the roller 40 for engagement by plate 77 to form the apron A as well as position the pinion 76 of each unit to be engaged by the drive pinion 54 of the arm unit 50.

Referring now more particularly to FIGS. 1 and 3, when the ferris wheel unit 3 is indexed into a selected stock dispensing position by rotation of the Geneva drive 13 in a clockwise direction as viewed in such figures, it is desirable to have the stock S extending from the selected unit so that the leading edge thereof indicated at 90 in FIG. 1, which may be cut on a bias, can readily be applied to the surface of the drum machine 2. Moreover, when the operator of the machine 2 is finished with the stock, he may sever the same at approximately the position indicated at 90 and when the ferris wheel then indexes to a further dispensing station, it is desirable to have the portion of the stock overhanging the edge of the apron formed by the roll 32 retracted or withdrawn back into the supply roll 22 so that the stock will then clear the drum as well as the top 52 of the housing 53. Of course, the operator may wish to skip one or more dispensing stations and accordingly pay-out and subsequent wind-up of the stock in these stations is not necessary or desirable.

In order to accomplish the pay-out and wind-up of the stock in the dispensing units in response to rotation of the ferris wheel 3, there are provided pay-out and wind-up racks 91 and 92, respectively, which are adapted to mesh with gear 93 of each unit, such gear unit being keyed to extension 94 of the countershaft 78. The rack 92 is adapted to engage the top of the gear 93 as it moves therepast rotating such gear in a clockwise direction as viewed in FIG. 3 to cause the liner drive roll 24 to rotate in a counterclockwise direction to wind the liner from the liner roll 23 back into the stock roll 22 and thus to withdraw or pull inwardly the leading edge 90 of the stock S. Conversely, the rack 91 will mesh with the bottom of the gear 93 rotating such gear in a counterclockwise direction as viewed in FIG. 3 to rotate the drive roll 24 in a clockwise direction to pull the liner from the stock roll extending the stock into proper position for application to the drum after the unit has cleared the drum and supporting sub-structure. The rack 91 is also positioned to engage the gear 93 of each dispensing unit before the ferris wheel has been accelerated to top indexing speed by the Geneva drive 13 for most effective pay-out of the stock.

The rack 92 is pivotally mounted on pin 95 extending from bracket 96 which is provided with an arm terminating in hub 97 accommodating therethrough an adjusting rod 98 which is connected to pin 99 pivoted to the opposite end of the rack 92. A nut 100 is threaded on the upper end of such rod and a compression spring 101 surrounds such rod between the rack and the hub 97. The compression spring 101 then maintains the rack 92 resiliently in engagement with the gear 93 as the dispensing unit 15 is indexed therepast and such gear comes into mesh with the rack.

The bracket 96 is mounted for sliding movement in gibs 103 and 104 which are secured by suitable fasteners 105 to the central frame 5. The bracket 96 terminates in an L-shape portion or flange 107 which has secured thereto rod 108 of piston-cylinder assembly 109, the latter being secured to support plate 110 in turn secured to the frame structure 5. It can now be seen that by retracting the piston-cylinder assembly 109, even through a relatively short distance, the bracket 96 will be slid along the gibs 103 and 104 and the rack segment 92 will be withdrawn from a path of engagement with the gear 93. Accordingly, the operator may optionally withdraw the rack to prevent such rack and gear engagement.

Similarly, the segment gear 91 is pivoted on pin 112 to bracket 113 having lateral flanges secured beneath gibs 114 and 115 secured by suitable fasteners 116 to extension 117 of the frame 5.

The bracket 113, like the bracket 96, also includes a laterally projecting portion terminating in a hub 118 through which extends a rod 119, such rod being secured at 120 to the end of segment rack 91. A nut 121 threaded on such rod is adapted to abut the hub 118 to limit movement of the rod therethrough. A compression spring 122 surrounds the rod between the hub 118 and nut 123 threaded on the projecting end thereof. Thus the compression spring 122 tends to bias the segment rack 91 in a counterclockwise direction about its center pivot 112 as viewed in FIG. 3. This will then tend to bring the leading edge of the rack resiliently into engagement with the gear 93 as the unit moves into position wherein the gear will mesh with such rack.

The bracket 113 inwardly terminates in an L-shape portion 125 secured to rod 126 of piston-cylinder assembly 127 which is in turn secured to the mounting plate 128. Accordingly, by extension of the piston-cylinder assembly 127, even through a relatively short stroke, the segment rack 91 may be moved out of a position in which it will engage the gear 93 of the dispensing unit as it is indexed therepast. Thus the operator, by retracting and extending the piston-cylinder assemblies 109 and 127, respectively, may position the racks controlled thereby to clear the gear 93 so that a liner will not be driven thereby to wind-up or pay-out the stock. It will, of course, be understood that other suitable drive mechanisms may be employed optionally to wind-up or pay-out the liner as desired in response to rotation of the ferris wheels and the proper positioning of the selected dispensing units.

The drive of the liner in response to rotation of the ferris wheel to wind-up and pay-out the stock is then imparted from the Geneva drive mechanism 13 which comprises a wheel having three equally spaced rollers 130 projecting from one face thereof which engage within radially extending slots 131 in the opposed face of plate 132 secured to the hub of the ferris wheel. Such slots 131 are six in number and equally circumferentially spaced so that rotation of the Geneva wheel 13 by the chain 12 through an arc of 120° will cause the roller 130 on the Geneva wheel 13 to enter one of the slots 131 and rotate the ferris wheel through an arc of 60°. It will be appreciated that such movement of the ferris wheel will cause the gear 93 to move from the full line position indicated in FIG. 3 to the phantom line position indicated at 135. In this manner, the segmental racks 91 and 92 will mesh with such pinion at the beginning of such indexing movement when the movement of the ferris wheel is the slowest.

It can now be seen that the liner roll 23 is positioned within the triangle formed by the apron forming arms 31 and the stock roll 22 as the apex of the triangle. In this manner, a much more compact loading and dispensing unit is provided within the ferris wheel and the side-by-side belts 83 and 85 may readily be covered with protective housings 137 as seen in FIG. 2 having elongated lateral projections 138 accommodating the outside belt 83.

On the tire building machine 2 side of the servicer, an improved synchro-differential system may be employed to synchronize the drive of the drum and the liner L so that the stock S may be fed from the liner to the drum at proper zero tension and without any buckling, distortion, etc. Referring now particularly to FIGS. 2 and 5, the drive motor 62, which may be an industrial D.C. motor, is provided with drive sprockets 140 and 141 at each end thereof which may have the same number of teeth and pitch diameter with timing belts 142 and 143 trained thereabout, respectively. The belt 142 is also trained about sprocket 144 mounted on clutch coupling 145 on input shaft 146 of gear reduction unit 147 of PIV 61. The gear reduction unit 147 has a shaft 148 projecting therefrom on which the sprocket 60 driving belt 59 and eventually the liner drive roll 24 is mounted. For example, the gear reduction unit 147 may reduce the r.p.m. of shaft 146 from 1200 to a speed for shaft 148 of 147.2 r.p.m. and rotate such shaft in the opposite direction.

The gear reduction unit 147 includes the constant speed input shaft of the PIV 61 which may be of conventional variety. Variable speed drives of the type illustrated transmit power through a drive chain of self-forming metal teeth that engage radial grooves in two pairs of cone-shape sprockets of variable effective diameters. Small movement of control shaft 150 is operative simultaneously to vary the effective diameters of the cone-shape sprockets providing substantially infinite, stepless speed adjustments between input and output shaft speeds. The control shaft 150 may be provided with a sprocket 151 driven by chain 152 from sprocket 153 of motor and brake unit 154. A further sprocket 155 on the control shaft 150 drives chain 156 and sprocket 157 of a follower potentiometer 158 for precise maintenance and control of the synchro-differential system.

The PIV may also include a gear train which consists of single reduction gearing from the constant speed input shaft from the reduction gear box 147 to a built in differential side gear as well as reduction gearing from the variable speed shaft to the differential side gears. The side gears may turn in the same direction, but the constant speed and the variable speed shafts may rotate in the same or opposite direction to the differential output shaft. In the illustrated application, the output shaft 160 of the PIV will thus rotate at a controlled variable speed in the same direction as the input shaft 146 of the unit 61. A sprocket 161 is mounted on the output shaft 160 and a timing belt 162 is trained thereabout and about sprocket 163 connected by clutch coupling 164 to jack shaft 165. The jack shaft 165 is provided with a sprocket 166 which drives a belt 167 trained about the tire drum flat pulley 168 mounted on the drum shaft 169 of the drum 170 of the tire building machine 2. The belt 143 entrained about the sprocket 141 on the opposite end of the drive motor 62 may also be trained about sprocket 172 connected through clutch coupling 173 to jack shaft 165. By controlling the energization of the clutches 164 and 173, the drum 170 may be rotated in the direction of the arrow 174 either directly from the motor 62 or through the synchronizing drives of the PIV 61.

It can now be seen that the PIV provides a simplified synchronizing drive which will rotate the drum 170 and the liner drive rolls 24 at the same controlled surface speed to drive the liner and thus the stock to be fed from the apron A to the drum at zero tension and without any distortion, buckling, or unevenness which might result in a faulty tire carcass.

It can now be seen that there is provided a compact tire servicer for tire building machines of the ferris wheel type which may include six storage and dispensing units within each ferris wheel. Each storage and dispensing unit includes a stock roll with a liner extending therefrom to the distal ends of the apron forming arms with the liner storage roll being situated within the included acute angle between the apron and the arms. Moreover, such liner storage roll is included within the triangle formed by the pivot for the arms, the stock roll, and the distal end of such arms. The liner drive roll is adjacent the pivot for the arms and such liner storage roll is of course, also within the triangle formed by the drive roll, stock roll and the distal ends of the arms. In this manner, a highly compact dispensing unit is provided enabling the operator to have readily available a wide variety of tire building materials. The operator may readily index the ferris wheel and optionally remove from effective engagement the liner wind-up and pay-out mechanisms which are responsive to ferris wheel rotation. Furthermore, a highly simplified synchronizing drive is provided between the drum 2 and the liner to ensure that the stock S will be properly dispensed onto the drum at zero tension without undue wrinkling or distortion.

Other modes of applying the principle of the invention may be employed, change being made as regards the details described, provided the features stated in any of the following claims or the equivalent of such be employed.

I, therefore, particularly point out and distinctly claim as my invention:

1. A tire servicer including a circular frame, a storage and dispensing unit in said circular frame comprising peripherally disposed circumferentially extending arms, pivot means for said arms on said frame, a stock roll journalled in said frame, a liner extending from said stock roll to the distal end of said arms at an acute angle with respect thereto to form an apron between said stock roll and the distal end of said arms, and a liner storage roll journalled in said frame operative to store liner payed from said stock roll and situated in said frame within the triangle formed by said stock roll, said pivot means and the distal end of said arms.

2. A tire servicer comprising a circular frame including a plurality of storage and dispensing units for tire building materials circumferentially positioned about said circular frame, each unit comprising circumferentially extending apron forming arms, a stock roll journalled in said frame, a liner extending from said stock roll to one end of said arms to form said apron, said apron and arms forming an acute angle, a liner storage roll journalled in said frame between said stock roll and arms and included within such acute angle a liner drive roll journalled in said frame adjacent the proximal ends of said apron forming arms for each of said units, and drive means operative to rotate said liner drive roll and thus drive the liner of a selected one of each of said units, said liner storage roll being within the triangle formed by said liner drive roll, the distal ends of said arms and said stock roll.

3. A tire servicer as set forth in claim 2 including drive means for said circular frame comprising Geneva drive and driven wheels, and means responsive to the rotation of said Geneva drive wheel through an arc of 120° to rotate said Geneva driven wheel through an arc of 60°.

4. A tire servicer as set forth in claim 3 including means responsive to the rotation of said circular frame operative to rotate said liner drive roll at the slower initial speed of said circular frame caused by said Geneva drive.

5. A tire servicer as set forth in claim 4 wherein said last mentioned means comprise a segment rack, a pinion for each said units operatively associated with the liner drive roll thereof, whereby rotation of said circular frame will cause said pinion to engage said rack thus to drive said liner.

6. The tire servicer as set forth in claim 2 wherein said drive means comprises a pivotally mounted arm having a drive gear on the end thereof, a driven gear for each of said units, and means operative to pivot said arm to mesh said drive and driven gears thus operatively to drive the liner of a selected unit of the servicer.

7. The tire servicer as set forth in claim 6 including a drive motor, a variable speed drive driven by said drive motor, means operatively connecting said variable speed drive and said drive gear on said pivotally mounted arm, a tire building drum, and means operatively connecting said variable speed drive and said tire building drum to rotate said drum and drive the liner of the selected unit at a synchronized surface speed.

8. In combination, a tire servicer and an associated drum type tire building machine, a plurality of storage and dispensing units in said servicer, means operative to index said servicer to present a selected one of said units in loading position with respect to said drum type tire building machine, a drive motor for said drum type tire building machine, a variable speed drive driven thereby, and means operatively connecting said drum type tire building machine to said variable speed drive and the selected one of said units to said variable speed drive to drive the same in synchronism to dispense from said selected unit tire fabric material to said drum type tire building machine at substantially zero tension; an input gear reducer on said variable speed drive, means operative to drive the selected one of said units from said input gear reducer, and means operative to drive the drum of said tire building machine from the output of said variable speed drive.

9. The combination set forth in claim 8 wherein said servicer comprises a circular frame and each unit comprises circumferentially extending apron forming arms, a stock roll, a liner extending from said stock roll to one end of said arms to form said apron, said apron and arms forming an acute angle, and a liner storage roll between said stock roll and arms and included within such acute angle.

10. The combination set forth in claim 9 including means operative to index said circular frame to present a selected one of said units in position for dispensing tire building materials to said drum type tire building machine.

11. The combination set forth in claim 10 including means operative to connect and disconnect said drive from said variable speed drive to the selected one of said units to facilitate indexing of said circular frame.

12. The combination set forth in claim 10 wherein said last mentioned means comprises a pivotally mounted drive arm having a drive gear on the end thereof operative drivingly to mesh with a driven gear on the selected unit when pivoted toward said unit.

13. A tire servicer comprising a circular frame including a plurality of storage and dispensing units for tire building materials circumferentially positioned about said circular frame, each unit comprising circumferentially extending apron forming arms, a stock roll journalled in said frame, a liner extending from said stock roll to one end of said arms to form said apron, said apron and arms forming an acute angle, a liner storage roll journalled in said frame between said stock roll and arms and included within such acute angle, a liner drive roll journalled in said frame for each of said units, drive means operative to rotate said liner drive roll and thus drive the liner of a selected one of each of said units, drive means for said circular frame comprising Geneva drive and driven wheels, means responsive to the rotation of said Geneva drive wheel through an arc of 120° to rotate said Geneva driven wheel through an arc of 60°, means responsive to the rotation of said circular frame operative to rotate said liner drive roll at the slower initial speed of said frame caused by said Geneva drive, said last mentioned means comprising a segment rack, a pinion for each of said units operatively associated with the liner drive roll thereof, whereby rotation of said circular frame will cause said pinion to engage said rack to drive said liner, and means mounting said rack selectively for movement into and out of a position wherein said rack will engage said pinion.

14. A tire servicer as set forth in claim 13 including two such segment racks arranged to engage the opposite side of the respective pinions of adjacent units as said servicer is indexed therepast at the slower initial speed of said circular frame caused by said Geneva drive.

15. In combination a tire servicer and an associated drum type tire building machine, a plurality of storage and dispensing units in said servicer, means operative to index said servicer to present a selected one of said units in loading position with respect to said drum type tire building machine, a drive motor for said drum type tire building machine, a variable speed drive driven thereby, means operatively connecting said drum type tire building machine to said variable speed drive and the selected one of said units to said variable speed drive to drive the same in synchronism to dispense from said selected unit tire fabric material to said drum type tire building machine at substantially zero tension, an input gear reducer on said variable speed drive, means operative to drive the selected one of said units from said input gear reducer, means operative to drive the drum of said tire building machine from the output of said variable speed drive, a control shaft for said variable speed drive, a motor and brake unit driving said control shaft, and a follower potentiometer driven from said control shaft.

References Cited by the Examiner
UNITED STATES PATENTS

| | | | |
|---|---|---|---|
| 1,254,827 | 1/1918 | Midgley | 156—406 |
| 2,021,130 | 11/1935 | Erickson | 156—406 |
| 2,625,198 | 1/1953 | Bostwick | 156—405 X |
| 2,655,321 | 10/1953 | Sternad et al. | 156—406 X |
| 2,671,495 | 3/1954 | Iredell et al. | 156—406 X |
| 2,918,105 | 12/1959 | Harris | 156—406 X |

EARL M. BERGERT, *Primary Examiner.*

C. B. COSBY, *Examiner.*